United States Patent
Gallagher et al.

(10) Patent No.: US 9,458,589 B2
(45) Date of Patent: Oct. 4, 2016

(54) SCOUR REMEDIATION AND MITIGATION APPARATUS

(71) Applicants: SWAN NET-GUNDRY LIMITED, County Donegal, Killybegs (IE); NOR-FOLK MARINE LIMITED, County Donegal, Mountcharles (IE)

(72) Inventors: Jonathan Francis Gallagher, Killybegs (IE); William Austin Wilcox, Mountcharles (IE)

(73) Assignee: SWAN NET-GUNDRY LIMITED, Killybegs (IE)

( * ) Notice: Subject to any disclaimer, the term of this patent is extended or adjusted under 35 U.S.C. 154(b) by 0 days.

(21) Appl. No.: 14/766,916

(22) PCT Filed: Feb. 18, 2014

(86) PCT No.: PCT/EP2014/053159
§ 371 (c)(1),
(2) Date: Aug. 10, 2015

(87) PCT Pub. No.: WO2014/125127
PCT Pub. Date: Aug. 21, 2014

(65) Prior Publication Data
US 2016/0002872 A1  Jan. 7, 2016

(30) Foreign Application Priority Data
Feb. 18, 2013  (IE) .................................. S2013/0055

(51) Int. Cl.
*E04D 1/34*  (2006.01)
(Continued)

(52) U.S. Cl.
CPC ................. *E02B 3/126* (2013.01); *E02B 1/00* (2013.01); *E02B 3/122* (2013.01); *E02B 17/0017* (2013.01); *E02B 2201/04* (2013.01); *F16L 1/123* (2013.01); *Y02W 30/687* (2015.05)

(58) Field of Classification Search
CPC ....................................................... E02B 3/02
See application file for complete search history.

(56) References Cited

U.S. PATENT DOCUMENTS 5,370,475 A * 12/1994 LeBlanc ................. E02B 3/122
405/16
5,762,448 A *  6/1998 Bilanin .................... E02B 3/02
405/211
5,807,023 A     9/1998 Krenzler
(Continued)

FOREIGN PATENT DOCUMENTS

EP          2317011        5/2011
GB          2468041        8/2010

*Primary Examiner* — Benjamin Fiorello
*Assistant Examiner* — Douglas S Wood
(74) *Attorney, Agent, or Firm* — Tutunjian and Bitetto, P.C.

(57) ABSTRACT

The present disclosure is directed towards a scour remediation and mitigation apparatus (100) comprising a plurality of channelled members (108) whereby the channelled members (108) are bound together to form the scour remediation and mitigation apparatus (100). The plurality of channelled members (108) each comprising at least one through hole (105) which forms a channel (105) through the channeled member (108). The plurality of channelled members (108) are bound together such that a plurality of conduits are formed by the channels (105) of the channeled members (108) and by voids (107) intermediate adjacent channelled members (108) within the scour remediation and mitigation apparatus (100). These plurality of conduits allow passage of a moving fluid through the scour remediation and mitigation apparatus (100) whilst simultaneously causing dispersion of kinetic energy of the moving fluid as it passes through the scour remediation and mitigation apparatus (100). The advantage of providing the plurality of conduits within the scour remediation and mitigation apparatus (100) is that the currents which are deflected off seabed structures, and which would otherwise erode at the seabed causing scouring, are diverted, deflected and dispersed through the plurality of conduits, thus mitigating the scouring effect. The energy is dissipated through the conduits and is slowed to the point where the particles on the seabed cannot be lifted and carried away.

18 Claims, 9 Drawing Sheets

(51) Int. Cl.
 *E02B 3/04*    (2006.01)
 *E02B 3/06*    (2006.01)
 *E02B 3/12*    (2006.01)
 *E02B 17/00*   (2006.01)
 *E02B 1/00*    (2006.01)
 *F16L 1/12*    (2006.01)

(56) References Cited

U.S. PATENT DOCUMENTS 6,305,876 B1 * 10/2001 Yoshino ............ E02B 17/0017
                   405/15
6,558,076 B2 * 5/2003 Liaw ................ E02B 3/066
                   405/30

* cited by examiner

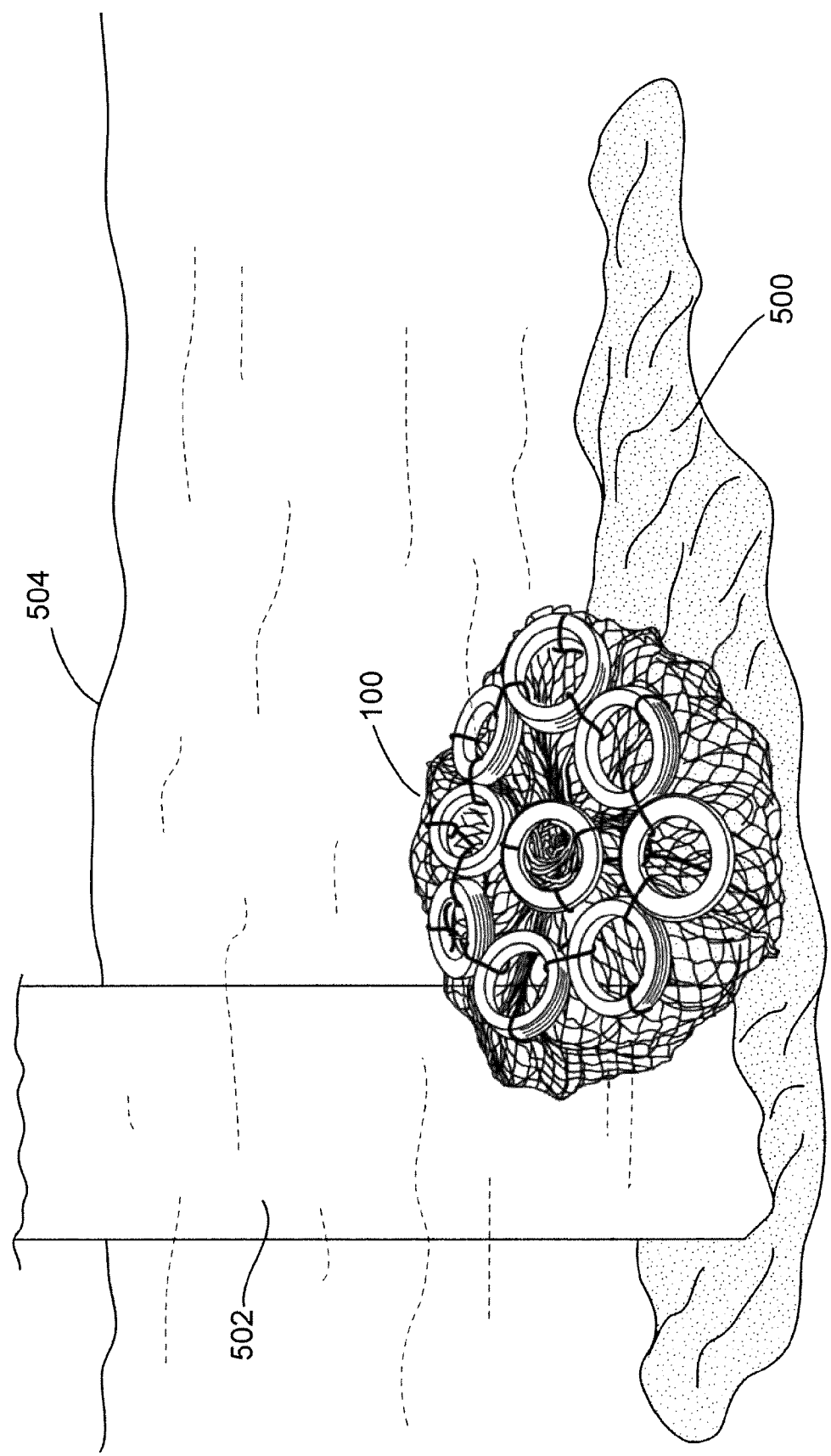

SCOUR REMEDIATION AND MITIGATION APPARATUS

INTRODUCTION

The present disclosure relates to a scour remediation and scour mitigation method and apparatus.

In particular, the present disclosure is directed towards a simple and effective apparatus for remediating scour damage and preventing, or at least mitigating against future scour from occurring adjacent underwater structures and particularly at the base of posts, masts, piles, jetties, moorings, piers and other such structures which have been affixed to the seabed, or, structures which are located close to the seabed such that scouring can occur due to the position of the structure. It will be also understood that the remediation and mitigation of scouring around other objects and structures adjacent a seabed is envisaged. For example, scouring is also known to occur in the environs of seabed cables and piping and it is envisaged that the present disclosure would have applicability in the remediation and mitigation of scouring adjacent such cabling and piping.

In essence, the present disclosure is envisaged to be used to protect any structure which is, at least in part, adjacent to or in abutment with a bed of a body of water, which bed is subject to potential scouring.

Of particular importance is the protection of wind turbines which have been installed out at sea, due to the high value of these turbines.

These wind turbines will normally comprise a pile affixed to the seabed, with turbine blades of the wind turbine and a generator being mounted on top of the pile. Scouring occurs around the base of the pile as the currents of water flowing beside the pile causes the seabed to be eroded around the base of the pile. As the currents of water flow past the pile, the water is deflected around the pile causing a flow speed differential which urges seabed particles away from the base of the pile. Moreover, the pile also deflects currents, which flow directly into its face, downwardly towards the seabed in front of the pile. This downward deflection of the currents erodes the seabed directly in front of the pile. A depth of scouring of six metres has been observed over a single six hour tidal period. As the tide changes direction every six hours, this erosion effect is seen to occur on both the leading face and the trailing face of the pile. The combination of these eroding actions causes the scouring around a large portion of the seabed adjacent the base of the pile, which can greatly weaken the integrity of the structure and is highly undesirable.

Remediation of such scouring is required by using in-fill to repair the scour damage to the seabed.

However, structures out at sea are difficult to reach and are consequently very difficult and costly to repair, particularly where the repairs must be carried out underwater. It is of utmost importance that such seabed structures, which are analogously also referred to as underwater structures, are robust and require as little maintenance as possible. Thus, remediating scour damage and minimising future scour is a very important consideration for such underwater structures. It is also desirable to carry out the remediation work in as cost effective a manner as possible. During the scouring remediation work, mitigating against the possibility of further scour damage by minimising the effects of scouring is also important.

In addition to the weakening of the integrity of seabed turbine pile structures, scouring also causes a further problem in that the removal of the seabed around the base of a pile will change the length of the pile, as measured from its contact point into the seabed to the top of the pile. The length of the pile is a factor in the fundamental frequency and harmonic frequencies of the pile. As the fundamental frequency and the harmonic frequencies define the frequencies at which the pile will vibrate with most amplitude, the length of the pile receives special consideration during the design phase by the design engineers. As the vibrations at these fundamental and harmonic frequencies are substantially at their greatest amplitude, it is the vibrations at these frequencies which tend to result in mechanical failure of the pile due to material stress and material fatigue over time.

With the danger of material stress and material fatigue being greatest at these fundamental and harmonic frequencies, it is known to arrange for vibration dampening at these fundamental and harmonic frequencies. Thus, a change to the length of the pile will have an effect on these fundamental and harmonic frequencies of the pile; and, if any frequency dampening measures have been put in place in an effort to reduce the vibrations, the change in length will lessen the dampening effect of the frequency dampening measures which would have been tuned in accordance with the original length of the pile. It is known from prior art cases where the scour has caused a change in the fundamental and harmonics frequencies of the pile, that the wind turbines have had to be kept switched off at optimum wind speeds due to the risk of mechanical failure which has arisen from the scouring negatively impacting the wind turbine's ability to dampen vibrations. Thus, as a result of scouring, operations of otherwise fully functional turbines sometimes necessarily must be halted due to the potential safety issues which the scouring has caused. Thus, it can readily be appreciated that a pressing need to exists in the industry to mitigate and/or reduce the effects of scouring in and about piles of wind turbines at sea and other bodies of water.

Attempts at mitigating or preventing such scouring include rock fill, concrete blocks, stone bags and/or large boulders placed around the bases of seabed structures in order to mitigate the scouring. One such stone bag is shown in U.S. Patent Publication U.S. Pat. No. 6,305,876 (KYOWA KABUSIKI KAISHA). It is the present trend in the industry and the current state of the art to utilize such structures in attempt to mitigate the scouring problem taught supra, it being a widely held belief in the field that a scour mitigating apparatus and/or structure disposed on a seabed or bed of other body of water in and about the vicinity of a wind turbine pile must be as heavy as possible in order to preclude displacement of the structure and/or apparatus from sustained exposure to currents and the deflections of such currents off of the piles. When stone bags and/or rock piles are used, the stones and/or rocks are generally selected to have a specific gravity similar to or greater than that of Portland Cement. The cement blocks are placed together so as to fit as close and tightly as possible and the rock piles are densely formed in order to preclude through-holes in the structure, and certainly in order to preclude through-holes in the majority of the structure of the rock piles, stone bags and/or adjacently placed cement blocks, it being a widely held belief in the field that the more dense and less porous the anti-scour and scour remediation and mitigation structure and/or apparatus that the more successful it is at avoiding being displaced by currents and consequently the more successful it is at preventing and/or mitigating the damaging scour.

Nonetheless, the known art has failed to provide a structure or method for a scour remediation, mitigation and/or prevention apparatus that solves the pressing needs of the industry and problems of scour associated with wind turbine piles disposed at sea or in a body of water, and the problems associated with such scour have failed to be redressed by the known art.

Thus, it can readily be appreciate that a long felt need continues to exist in the industry for a solution, which is simple and effective at first remediating scour damage by filling any scoured holes on the seabed, and secondly preventing, or at least minimising further scour damage from occurring at the base of the sea structures, which have been affixed to the seabed, is sought.

In addition to addressing the need to remediate and prevent scour adjacent to piles disposed on the seabed, the present disclosure is further directed towards a simple and effective apparatus and method for remediating and preventing, or at least minimising, scour from occurring adjacent piping, cabling and anchors which simply lie on the seabed.

It is a goal of the present disclosure to provide a method and/or apparatus that overcomes at least one of the above-mentioned problems.

More specifically, it is a goal of the present disclosure to provide for an scour remediation and mitigation apparatus that effectively mitigates the effects of scour in and about wind turbine piles disposed on a bed in a body of water to such an extent that the safe and continual operation of the wind turbines at optimal wind velocities is not negatively affected by the effects of scour, while also providing for improved economy and improved reliability of wind turbine operations, with a scour remediation and mitigation apparatus that is economical to manufacture, deploy and maintain.

SUMMARY OF THE PRESENT DISCLOSURE

The present disclosure is based upon a surprising and unexpected discovery that, contrary to the state of the art, against the trend in the industry and contrary to the widely held beliefs in the industry, an effective scour remediation and mitigation apparatus is achieved by forming a structure having in combination:
  a) a plurality of through holes, where at least some and preferably most of the through holes are able to have positioned into at least a portion of a passageway, especially a channel, forming each such through-hole an entire sphere having a diameter of at least five centimetres, and preferably a diameter of greater than six centimetres; and
  b) a weight in air that is less than sixty percent of a weight in air of a known art scour remediation and mitigation structure formed of cement blocks and/or stone bags and/or rock armour.

The present disclosure is further directed towards a scour remediation and mitigation apparatus comprising a plurality of channelled members whereby the channelled members are bound together to form the scour remediation and mitigation apparatus; the plurality of channelled members each comprising at least one through hole which forms a channel through the channelled member; the plurality of channelled members being bound together such that a plurality of conduits are formed by the channels of the channelled members and by voids intermediate adjacent channelled members within the scour remediation and mitigation apparatus; with, the plurality of conduits allowing passage of a moving fluid through the scour remediation and mitigation apparatus whilst simultaneously causing dispersion of kinetic energy of the moving fluid as it passes through the scour remediation and mitigation apparatus.

For purposes of the present disclosure, the term "through hole" shall be defined to include, but not be limited to, a channel and/or passageway traversing from a first side of an object to another side of the object, the another side of the object preferably being a side of the object opposite the first side of the object, but in some instances possible being a side of the object that is not opposite the first side of the object.

The advantage of providing the plurality of conduits within the scour remediation and mitigation apparatus is that the currents which are deflected off seabed structures, and which would otherwise erode at the seabed causing scouring, are diverted, deflected and dispersed through the plurality of conduits, thus mitigating the scouring effect. The energy is dissipated through the conduits and is slowed to the point where the particles on the seabed cannot be lifted and carried away. The channelled members may be arranged irregularly when bound together to cause a pseudo-random arrangement of conduits within the scour remediation and mitigation apparatus. Alternatively, the channelled members may be arranged in a regularised pattern, but nonetheless still provide a plurality of conduits allowing passage of a moving fluid through the scour remediation and mitigation apparatus whilst simultaneously causing dispersion of kinetic energy of the moving fluid as it passes through the scour remediation and mitigation apparatus.

In a further embodiment, the channelled members are bound together within a flexible porous housing.

In a further embodiment, the flexible porous housing is a net. In a further embodiment, the flexible porous housing is a net bag. The net bags are particularly simple ways of effecting the present disclosure and are known to be suitable for long term deployment under water in saline conditions.

In a further embodiment, the plurality of channelled members are connected in series together. In a further embodiment, the plurality of channelled members are each connected to at least one other channelled member.

In a further embodiment, the plurality of channelled members are connected together by a length of rope. In a further embodiment, the length of rope is preferably a length of laid rope.

In a further embodiment, the plurality of channelled members are connected together by bolting the channelled members to one another. In a further embodiment, the plurality of channelled members are connected together by welding the channelled members to one another. In a further embodiment, the plurality of channelled members are connected together by tying the channelled members to one another by using a plurality of ties. It will be readily understood that any suitable joining methods may be preferably used to connect the channelled members together In a further embodiment, a portion of the plurality of channelled members are connected together into a string of channelled members, and each of the channelled members in the string of channelled members are only connected to other channelled members in said string of channelled members. In a further embodiment, the plurality of channelled members are arranged into a set of distinct strings of channelled members. In a further embodiment, each distinct string of channelled members comprises a substantially equal number of channelled members.

In a further embodiment, the scour remediation and mitigation apparatus comprises affixing means to allow each scour remediation and mitigation apparatus to be affixed to at least one other scour remediation and mitigation apparatus. In a further embodiment, the net of the scour remediation and mitigation apparatus comprises ties which extend outwardly from the net bag to act as affixing means to allow the scour remediation and mitigation apparatus to be affixed to at least one other scour remediation and mitigation apparatus.

In a further embodiment, the remediation and mitigation apparatus comprises means for connecting weights to the scour remediation and mitigation apparatus. In a further embodiment, the net of the scour remediation and mitigation apparatus comprises ties which extend outwardly from the net bag to allow weights to be connected to the scour remediation and mitigation apparatus.

In a further embodiment, the scour remediation and mitigation apparatus comprises a location transmitting beacon.

In a further embodiment, the channelled members have a specific weight that preferably is less than 2.1, and preferably is in the range of 1.05 to 2.

In a further embodiment, the channelled members are torus in shape. In a further embodiment, the channelled members are annular in shape.

In a further embodiment, the channelled members are made of a rubber. In a further embodiment, the channelled members are rings having a C-shaped cross-section.

In a further embodiment, the channelled members are tyres. Preferably, the tyres are used vehicular tyres, and most preferably the tyres are used car tyres.

The advantage of using tyres as the channelled members in the scour remediation and mitigation apparatus is that the majority of the scour remediation and mitigation apparatus can be sourced at low cost. Indeed, in many cases a recycling centre or scrap yard will pay for used tyres to be taken away. Tyres have also been found to be advantageous as the tyres will have substantially the same specific gravity as particles on the seabed and therefore the tyres will not sink into the seabed, which would further increase the difficulty of removing the tyres from the seabed.

In addition, the channelled members of the present disclosure may comprise an object having a through hole forming at least part of a channel where: (i) a sphere of at least five centimetres diameter and more preferably of at least six centimetres diameter can be in its entirety fit into at least a portion of the channel formed by the through hole; and/or (ii) where a width measured across at least a portion of the channel is at least two centimetres and preferably at least twenty-six centimetres.

As apparent from the novel teachings of the present disclosure, and contrary to state of the art and against the trend and widely held beliefs in the industry, the scour remediation and mitigation apparatus of the present disclosure is achieved by forming a structure having in combination:

a) a plurality of through holes, where at least some and preferably most of the through holes are able to have positioned into at least a portion of a passageway, especially a channel, forming each such through-hole an entire sphere having a diameter of at least five centimetres, and preferably a diameter of greater than six centimetres, more preferably a diameter of greater than nine centimetres, yet more preferably a diameter of greater than twelve centimetres, and yet more preferably a diameter of greater than twenty centimetres; and b) a weight in air that is less than sixty percent of a weight in air of a known art scour remediation and mitigation structure formed of cement blocks and/or stone bags and/or rock armour, and preferably less than fifty percent the weight in air of such known art structures, when the scour remediation, prevention and mitigation structure of the present disclosure and the cement blocks and/or stone bags and/or rock armour of the known art structures are formed in such a fashion that an typical construction for each such structure is made so that the largest typical embodiment of any of such structures to be compared in weight will fit inside a cube having a height of two meters, a width of two meters, and a length two meters, and then the structure inside the cube is weighed in air.

The present disclosure is further directed towards a scour remediation and mitigation apparatus suitable for deployment adjacent an underwater structure, the scour remediation and mitigation apparatus comprising a substantially monobloc body having a plurality of through conduits arranged therein, each conduit branching off at least one other conduit in the monobloc body so as to allow passage of a moving fluid through the scour remediation and mitigation apparatus whilst simultaneously causing dispersion of kinetic energy of the moving fluid as it passes through the conduits of the scour remediation and mitigation apparatus.

The advantage of providing the plurality of conduits within the monobloc scour remediation and mitigation apparatus is that the currents which are deflected off seabed structures, and would otherwise erode at the seabed causing scouring, are diverted, deflected and dispersed through the plurality of conduits, whereby the scouring effect is mitigated. The energy is dissipated through the conduits and is slowed to the point where the particles on the seabed cannot be lifted and carried away. It is important for the monobloc to have a sufficient number of conduits and/or conduits of a sufficient size so as to have a relatively high transmissivity which will allow the water fluid to pass through the monobloc scour remediation and mitigation apparatus rather than be deflected around the monobloc scour remediation and mitigation apparatus. As the water is passed through the monobloc scour remediation and mitigation apparatus in the conduits, the kinetic energy of the water fluid is dissipated, deflected and diverted such that the scour remediation and mitigation apparatus acts as a scour prevention apparatus.

In a further embodiment, the scour remediation and mitigation apparatus comprises affixing means to allow each scour remediation and mitigation apparatus to be affixed to at least one other scour remediation and mitigation apparatus. In a further embodiment, the scour remediation and mitigation apparatus comprises ties which extend outwardly from the scour remediation and mitigation apparatus to act as affixing means to allow the scour remediation and mitigation apparatus to be affixed to at least one other scour remediation and mitigation apparatus.

In a further embodiment, the remediation and mitigation apparatus comprises means for connecting weights to the scour remediation and mitigation apparatus. In a further embodiment, the scour remediation and mitigation apparatus comprises ties which extend outwardly from the scour remediation and mitigation apparatus to allow weights to be connected to the scour remediation and mitigation apparatus.

In a further embodiment, the scour remediation and mitigation apparatus comprises a location transmitting beacon.

In a further embodiment, the scour remediation and mitigation apparatus has a specific weight in the range of 1.05 to 2.

In a further embodiment, the scour remediation and mitigation apparatus is made of a rubber.

The present disclosure is further directed towards a method of protecting an underwater structure against scour, by installing a plurality of scour remediation and mitigation apparatuses, as described in any preceding examples, adjacent the underwater structure, the method comprising the steps of: lowering a first scour remediation and mitigation apparatus into position adjacent the underwater structure; lowering a second scour remediation and mitigation apparatus into position adjacent the underwater structure and affixing it to the first scour remediation and mitigation apparatus; lowering further scour remediation and mitigation apparatuses into positions adjacent the underwater structure and affixing them to at least one of the already lowered scour remediation and mitigation apparatuses, until the underwater structure is protected against scour by the plurality of scour remediation and mitigation apparatuses.

In a further embodiment, the scour remediation and mitigation apparatuses are lowered using weights. In a further embodiment, weights are attached to the scour remediation and mitigation apparatuses after they have been lowered into position.

In a further embodiment, the scour remediation and mitigation apparatuses are positioned during installation using location transmitting beacons.

In a further embodiment, the scour remediation and mitigation apparatuses each comprise a plurality of tyres bound together in a net bag, with further tyres being affixed to an exterior of the net bags of at least a portion of the scour remediation and mitigation apparatuses after the scour remediation and mitigation apparatuses have been lowered into position.

The present disclosure is further directed towards a scour remediation and mitigation apparatus comprising a plurality of channelled members housed within a net; the plurality of channelled members each comprising at least one through hole being arranged within the net such that the plurality of channelled members within the net form a plurality of conduits within the scour remediation and mitigation apparatus.

The advantage of providing the plurality of conduits within the scour remediation and mitigation apparatus is that the currents which are deflected off seabed structures, and would otherwise erode at the seabed causing scouring, are diverted, deflected and dispersed through the plurality of conduits, whereby the scouring effect is mitigated. The energy is dissipated through the conduits and is slowed to the point where the particles on the seabed cannot be lifted and carried away.

In a further embodiment, the channelled members are made of rubber. In a further embodiment, the channelled members are tyres.

The advantage of using tyres as the channelled members in the scour remediation and mitigation apparatus is that the majority of the scour remediation and mitigation apparatus can be sourced at low cost, and in some cases a recycling centre or scrap yard will pay for the tyres to be taken away. Tyres have also been found to be advantageous as the tyres will have substantially the same gravity as particles on the seabed and therefore the tyres will not sink into the seabed, which would further increase the difficulty of removing the tyres from the seabed.

In a further embodiment, the plurality of channelled members are connected together. In a further embodiment, the plurality of channelled members are connected in series together.

In a further embodiment, the plurality of channelled members are each connected to at least one other channelled member.

In a further embodiment, the plurality of channelled members are connected together by rope. The rope is preferably a laid rope.

In a further embodiment, a portion of the plurality of channelled members are arranged into a string of channelled members, and the portion of the plurality of channelled members in the string of channelled members are connected to one another.

In a further embodiment, a portion of the plurality of channelled members are arranged into a string of channelled members, and the portion of the plurality of channelled members in the string of channelled members are connected in series to one another.

In a further embodiment, the plurality of channelled members are arranged into a number of strings of channelled members, with each of the channelled members in a respective string of channelled members being connected to at least one other channelled member in that said string of channelled members.

In a further embodiment, the plurality of channelled members are arranged into a number of strings of channelled members, with each string of channelled members comprising a substantially equal number of channelled members; and, each of the channelled members in a respective string of channelled members being connected to at least one other channelled member in that said string of channelled members.

The present disclosure is further directed towards a scour remediation and mitigation apparatus suitable for deployment adjacent a base of a seabed structure, the scour remediation and mitigation apparatus comprising a substantially monobloc body having a plurality of through conduits arranged therein, each conduit branching off at least one other conduit in the monobloc body.

DETAILED DESCRIPTION OF EMBODIMENTS

The present disclosure is be more clearly understood by one ordinarily skilled in the art from the following description of some embodiments thereof, given by way of example only, with reference to the accompanying drawings, in which:

FIG. 5a is a diagrammatic view of a scour remediation and mitigation apparatus shown, in situ, about an underwater structure on a seabed;

Figure 8:
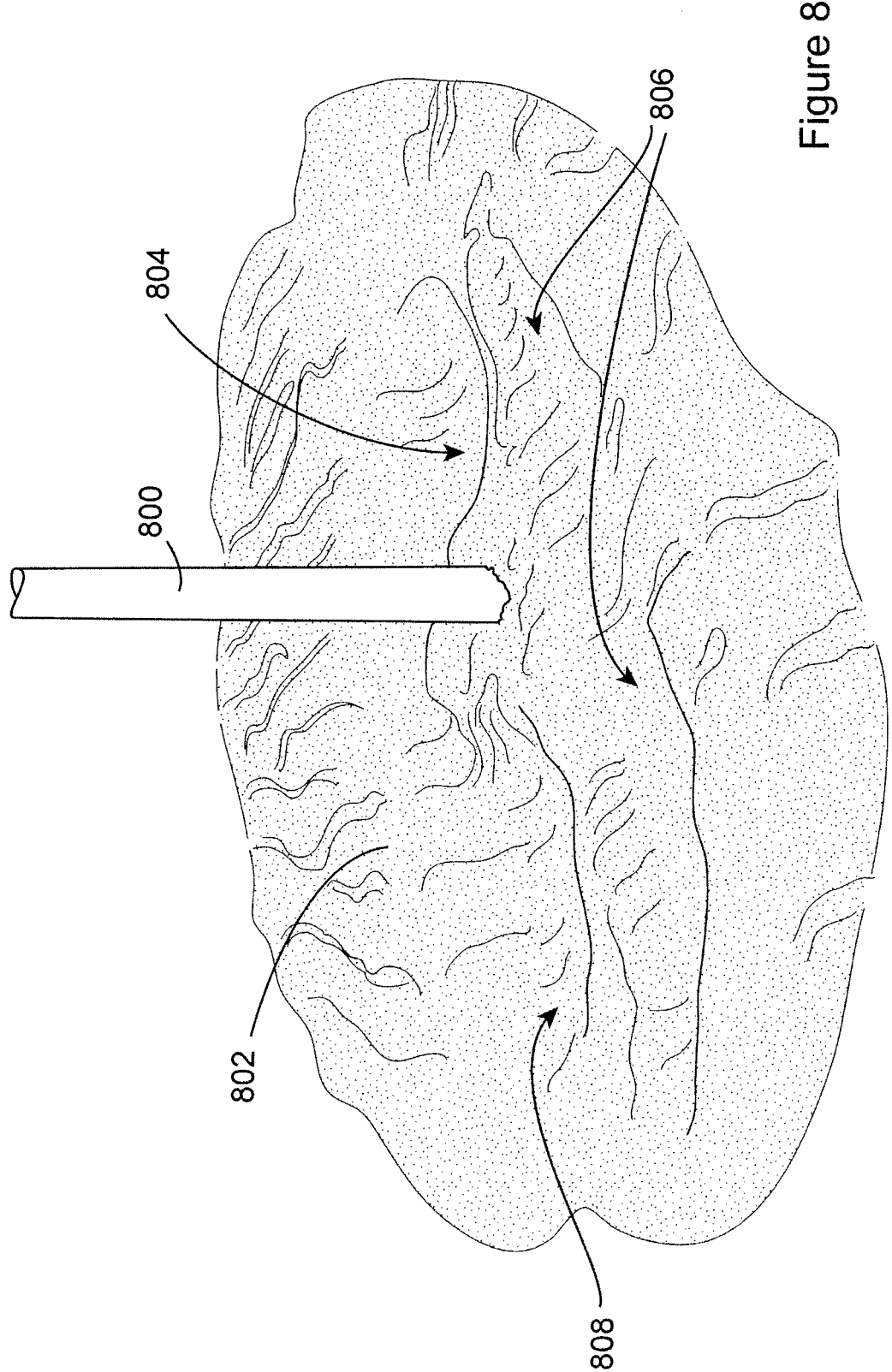

With reference initially to FIG. 8, there is shown an underwater structure indicated by reference numeral 800 which is in contact with a seabed 802. The effects of scouring about the underwater structure 800 can be seen as the scour damage results in the erosion of the seabed adjacent the underwater structure as indicated generally by reference numerals 804, 806, 808. Essentially small trenches or holes 804, 806, 808 are eroded into the seabed 802. These trenches or holes 804, 806, 808 needed to be remediated by in-fill, and it is desirable to prevent further scour damage from occurring in the future, after the remediation works have been completed. As can be seen in FIG. 8, due to the tidal change of direction of the currents causing the scour, the erosion effect is seen to occur on both the leading face and the trailing face of the underwater structure 800. The combination of these eroding actions causes the scouring around a large portion of the seabed 802 adjacent the base of the underwater structure 800, which can greatly weaken the integrity of the underwater structure 800, which is undesirable.

Figure 1:
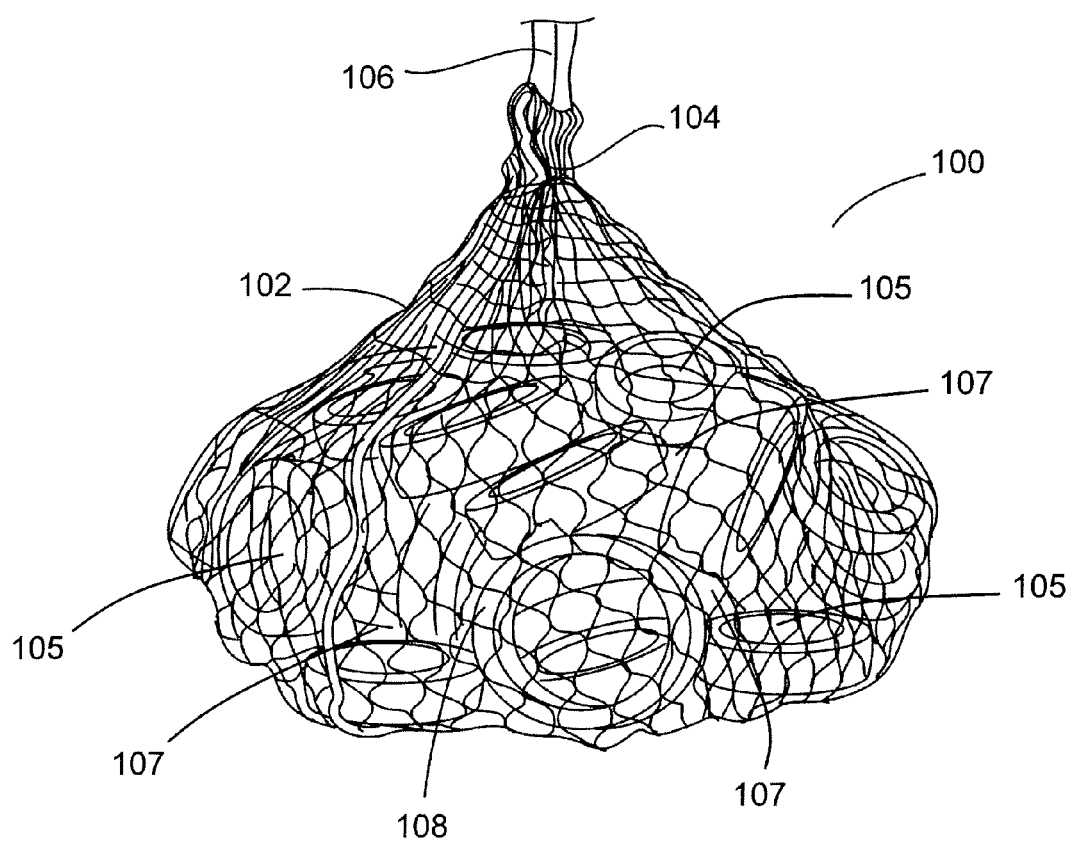
FIG. 1 is a diagrammatic view of a scour remediation and mitigation apparatus in accordance with the present disclosure.

Referring now to FIG. 1, there is provided a scour mitigation and remediation apparatus of the present disclosure, also, but not exclusively, referred to herein as a "scour remediation and mitigation apparatus" of the present disclosure, and also known herein as an "anti-scour apparatus", indicated generally by reference numeral 100. The scour remediation and mitigation apparatus 100 comprises a plurality of channelled members 108 housed within a flexible porous housing, such as net bag 102. The plurality of channelled members 108 each comprising at least one through hole 105 and are loosely bound within the net bag 102. The arrangement of the channelled members 108, each comprising at least one through hole 105, is such that the plurality of channelled members 108 within the net bag 102 form a plurality of conduits through which water can be diverted and deflected. The conduits are formed by the through holes 105 which form the channels 105 in the channelled members 108 and by voids 107 between adjacent channelled members 108 in the net bag 102. It is understood that the diversion and deflection of the currents of water through the scour remediation and mitigation apparatus 100 of the present disclosure causes the energy in the currents to be dissipated and this mitigates the scouring effects of the currents of water.

It will be understood that the channelled members 108 may be formed by any shape of object, where that object has a channel 105 passing through it. The size of the channel 105 passing through the channelled member 108 is important, as discussed in greater detail later, as this transmissivity of the channelled member 108 will ensure that secondary scouring does not occur due to the channelled member. Most preferably, the channel 105 is of sufficient dimension that a sphere of at least twenty centimetres can be passed through the channel 105 of an individual channelled member prior to connection of such channelled member to other channelled members and prior to incorporation of such channelled member into the structure of the present disclosure.

In a preferred embodiment, as can be seen throughout the Figures, the channelled members 108 in the scour remediation and mitigation apparatus 100 are used tyres. New tyres would of course be equally permissible to use, although the use of used tyres is commercially advantageous. These tyres are recycled and thus there is an environmental advantage to these old tyres which would otherwise have to be recycled through a costly recycling process. The tyres may preferably be washed and cleaned of any unwanted grease, oil and dirt, prior to be arranged within the net bag 102 to acts as the plurality of channelled members 108 in the scour remediation and mitigation apparatus 100.

The scour remediation and mitigation apparatus 100 is constructed in the following manner. The scour remediation and mitigation apparatus 100 comprises an opening 104 that is formed into the porous housing formed of the net bag 102 and which is securely closed after the scour remediation and mitigation apparatus 100 has been assembled by placing the plurality of channelled members 108 in the net bag 102. A handling loop or handling rope 106 may be secured to the net bag 102 adjacent the opening 104. This facilitates the deployment and installation of the scour remediation and mitigation apparatus 100 on the seabed and also facilitates the recovery of the scour remediation and mitigation apparatus 100 from the seabed.

Figure 2:
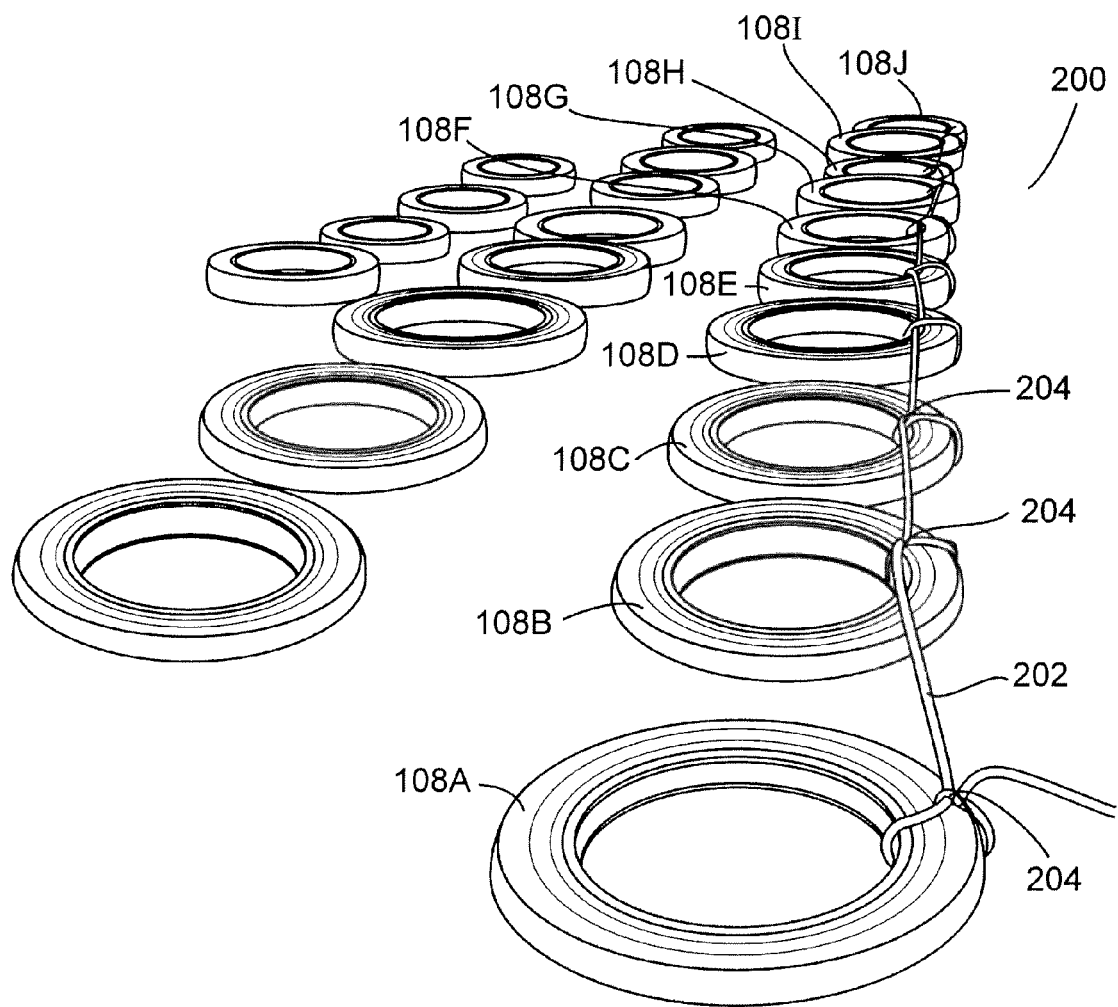
FIG. 2 is a diagrammatic view of a string of channelled members used in forming the scour remediation and mitigation apparatus of FIG. 1.

With reference to FIG. 2, in order to assembly the scour remediation and mitigation apparatus 100, a portion of the plurality of channelled members 108A-108J are arranged into a string 200 of channelled members. The portion of the plurality of channelled members 108A-108J are connected to one another using a rope 202. The rope 202 is preferably a laid, or twisted, rope.

Alternatively, the rope 202 may be a braided rope. In the preferred embodiment shown in FIG. 2, a 12 mm polypropylene rope 202 has been used.

It has been found that the most effective way to connect the plurality of channelled members 108A-108J to one another is to pass the rope 202 through the through hole 105 of a channelled member 108A, and then, after separating strands of the rope 202, pass the rope 202 through the separated strands of the rope 202, and on to the next channelled member 108B, where the process is repeated until all of the plurality of channelled members 108A-108J are connected in series together and arranged into the string 200 of channelled members. It will be readily understood that the channelled members 108A-108J may be connected by knotting the rope 202 rather than separating strands of the rope 202. Moreover, the channelled members 108A-108J could be connected using a plurality of individual ties, or by bolting the channelled members 108A-108J together, or by any other such joining means.

The string 200 may contain any number of channelled members 108A-108J, but in a preferred embodiment, the string 200 will comprise ten channelled members 108A-108J for ease of handling. A handling loop or handling rope length of approximately one metre may be provided for at one or both ends of the string 200 for ease of handling and lifting. Of course, different lengths of handling loop may be provided, as deemed appropriate. It will be understood that the channelled members 108A-108J do not have to be connected together in series although it is advantageous to do so from a handling point of view.

Figure 3:
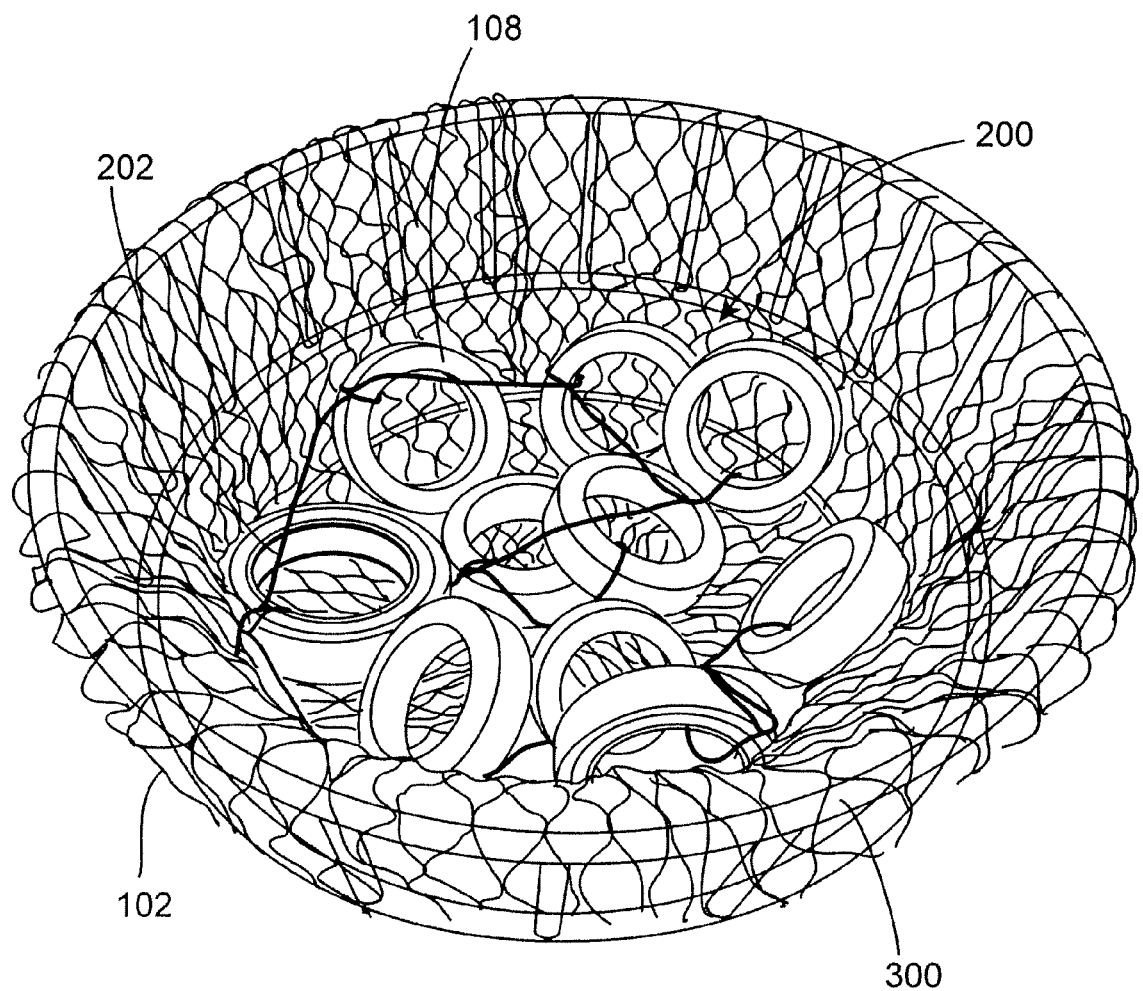
FIG. 3 is a diagrammatic view of the component part of FIG. 2 being placed in a net bag, held open by an assembly frame, so as to assemble the scour remediation and mitigation apparatus of FIG. 1.
Figure 4:
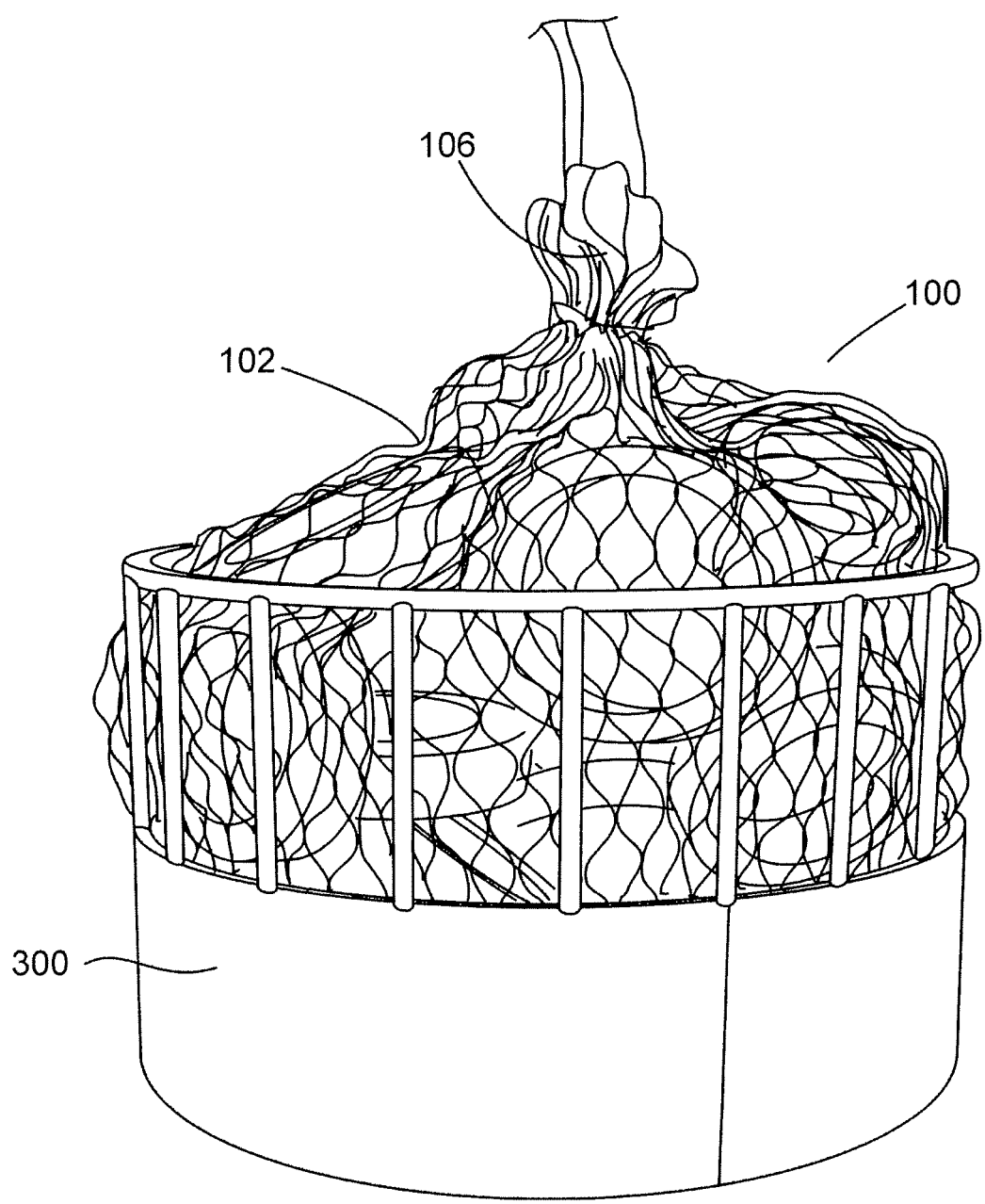
FIG. 4 is a diagrammatic view of the scour remediation and mitigation apparatus of FIG. 1 after assembly within the assembly framework.

Referring now to FIGS. 3 and 4, during assembly of the scour remediation and mitigation apparatus 100, the string 200 of the plurality of channelled members 108 is placed into the net bag 102. The net bag 102 may be held open within an assembly frame 300. The use of the assembly frame 300, which is substantially cylindrical in shape and is essentially an open ended drum, allows the string 200 of the plurality of channelled members 108 to be placed into the net bag 102. The opening of the net bag 102 is securely closed and the scour remediation and mitigation apparatus 100 can be lifted out of the assembly frame 300 by using the handling rope 106.

The plurality of channelled members 108 are arranged within the net bag 102 and this creates a plurality of conduits through the scour remediation and mitigation apparatus 100 formed by the channels 105 in the channelled members 108 and by the voids 107 between adjacent channelled members 108 in the net bag 102. It is understood that as tidal currents are deflected off a post at its base adjacent the seabed, the deflected currents, and in particular the kinetic energy within these currents, is dissipated as they are dispersed, diverted and deflected through the plurality of conduits in the scour remediation and mitigation apparatus 100. This dispersion, diversion and deflection has the result of mitigating against any further scour damage from been caused. The channelled members 108 are loosely bound together and settle into a scoured hole (i.e. a cavity or depression having been formed into a seabed by the scouring action described supra) by acting as an in-fill for the scoured hole in the seabed, and thus remediating the scour effects caused by such currents. An important aspect of the use of the channelled members 108, which are tyres of other such object with similar transmissivity characteristics, is that by diverting and dispersing the kinetic energy of deflected tidal currents through the plurality of conduits in the scour remediation and mitigation apparatus 100, the potential scour is mitigated and the secondary scouring is avoided. This is as the transmissivity of the channelled members 108 within the scour remediation and mitigation apparatus 100 is such that the currents will flow through the conduits formed in the scour remediation and mitigation apparatus 100. The transmissivity of the scour remediation and mitigation apparatus 100 is an important feature of the present invention. Surprising, unexpectedly, contrary to the state of the art and against the trend in the industry and against the widely held beliefs in the field the scour mitigation and remediation apparatus of the present disclosure is effective at both mitigation of scour, and also at remediating scour by, when placed in a scour hole, resulting in the eventual refilling of such scour hole by naturally occurring sediment, concurrent with the retention of such refilled in naturally occurring sediment and mitigation of future scouring.

To further describe producing the scour mitigation, prevention and remediation apparatus of the present: It will be understood that a plurality of strings 200 of channelled members 108 may be placed in a single net 102. By using a plurality of strings 200 of, for example, ten channelled members 108, the handling of the strings 200 is simplified. In order to fill a net having a volume of approximately 5 m$^3$, it has been found that approximately fifty channelled members 108, in the form of tyres, are required. It is beneficial to allow space within the net after the channelled members 108 have been added so that repositioning of the channelled members 108 underwater is relatively easily achievable so as to allow an installer to create a substantially flat surface if required. Thus, in the most preferable embodiment, five strings 200, each comprising ten channelled members 108A-108J, which are tyres, are placed into the net bag 102 to form the scour remediation and mitigation apparatus 100. The weight of fifty channelled members 108A-108J in the form of tyres in the scour remediation and mitigation apparatus 100 is approximately 425 kg on land, and will have a weight of approximately 80 kg underwater when taking the buoyancy of the scour remediation and mitigation apparatus 100 into account.

This is a relatively light weight which is beneficial for deployment and installation of the scour remediation and mitigation apparatus 100; and, it is also beneficial for the recovery of the scour remediation and mitigation apparatus 100 from the seabed. Furthermore, the risk of damaging underwater cabling and equipment during deployment is minimised and the scour remediation and mitigation apparatus 100, in some cases, can be deployed through dropping the scour remediation and mitigation apparatus 100 from a vessel and allowing the scour remediation and mitigation apparatus 100 to sink to the seabed before final positioning is carried out by an underwater installer.

Figure 5B:
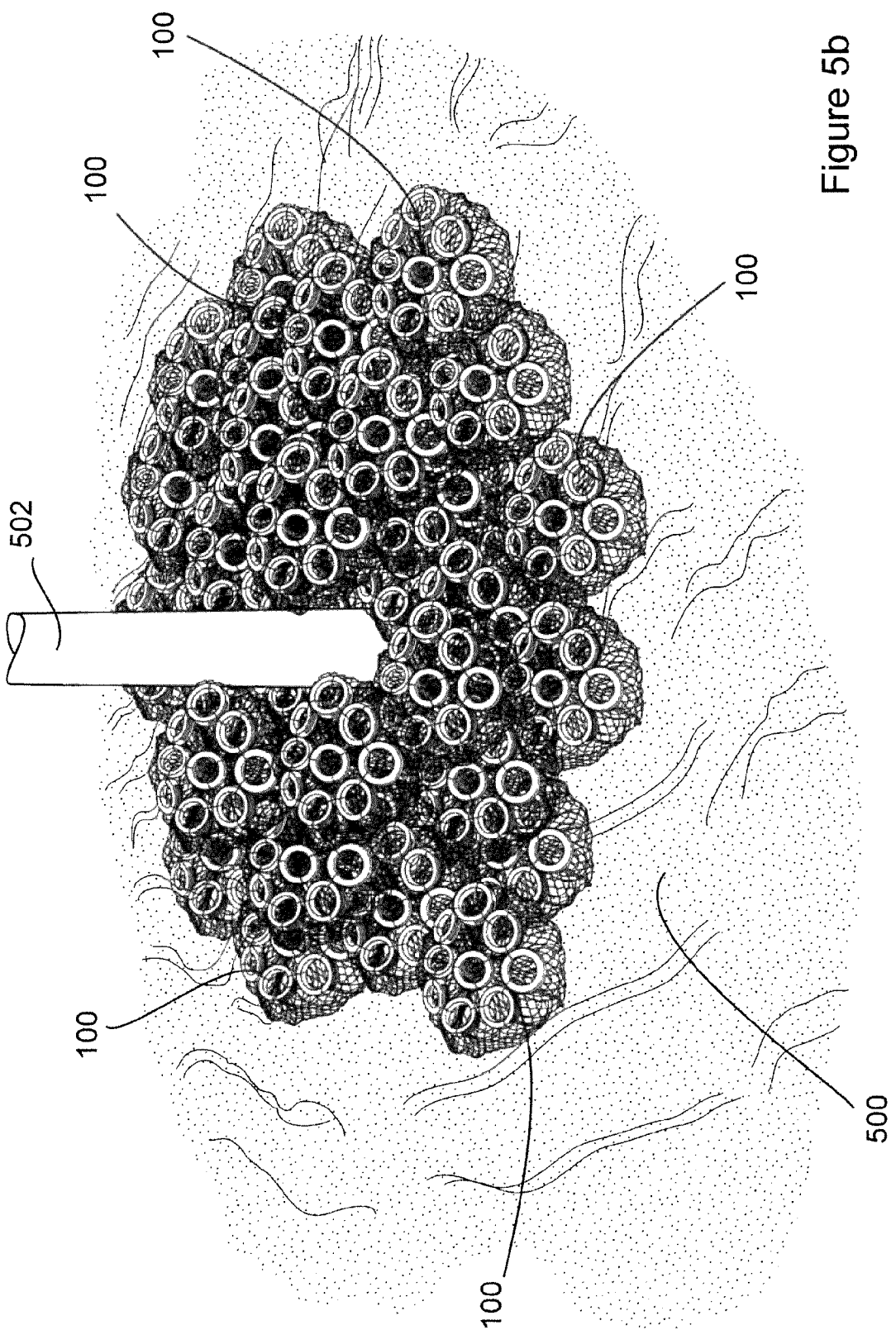
FIG. 5b is a diagrammatic view of a plurality of scour remediation and mitigation apparatuses shown, in situ, as part of an installation around an underwater structure on a seabed.

In use, and referring to FIG. 5a, a scour remediation and mitigation apparatus 100 is placed in a seabed hole or small trench in a seabed, which has been caused by scouring, in order to remediate the trench or hole, and furthermore to mitigate against the possibility of scouring occurring again. As can be seen with reference to FIG. 5b, it is envisaged that multiple scour remediation and mitigation apparatuses 100 will typically be needed to fill most trenches or holes left by scouring which occurs around the bases of seabed structures 502. It is of course envisaged to use just a single scour remediation and mitigation apparatus 100 if the size of just one scour remediation and mitigation apparatus 100 is appropriate for that particular installation, however normally a plurality of scour remediation and mitigation apparatuses 100 will be required for each installation.

With reference to FIG. 5a, the single scour remediation and mitigation apparatus 100 is shown arranged within a small trench/hole which was created on a seabed 500. Throughout an installation, further scour remediation and mitigation apparatuses 100 are placed adjacent the seabed structure 502 and on top of previously installed scour remediation and mitigation apparatuses 100 so that the trenches and holes and in-filled and a barrier to mitigate against future scouring is created, as shown in FIG. 5b. The plurality of scour remediation and mitigation apparatuses 100 are used to remediate any existing scour damage by in-filling any trenches or holes created by the scour damage, and also mitigate against further scour damage by dissipating the energy in the currents which cause the scour damage.

Referring to FIG. 5b, the scour remediation and mitigation apparatuses 100 are flexible and malleable enough so as to substantially mould to the shape of the trench or hole in the seabed 500 so as to fill the trench or hole fully. The scour remediation and mitigation apparatuses 100 can be seen to be installed adjacent the underwater seabed structure 502, which in this case is a pile for a turbine. In FIG. 5a, a portion of the underwater structure 502 can be seen to rise above a water level 504 of the body of water which is above the seabed 500.

Returning to FIG. 5b, by placing a plurality of these scour remediation and mitigation apparatuses 100 around the underwater structure 502 and on the seabed 500 or on other scour remediation and mitigation apparatuses 100, an installation of scour remediation and mitigation apparatuses 100 is established which will remediate any scour damage about the underwater structure 502 by retaining seabed particles in the channels 105 and voids 107 created by and within the scour remediation and mitigation apparatuses 100; and, future scour damage is mitigated through the dissipation of current energy by this installation by the scour remediation and mitigation apparatuses 100.

In a further embodiment, the scour remediation and mitigation apparatus may comprise affixing means to allow each scour remediation and mitigation apparatus to be affixed to at least one other scour remediation and mitigation apparatus. The affixing means are preferably in the form of ties which extend outwardly from the net bag of the scour remediation and mitigation apparatus to act as the affixing means which allow the scour remediation and mitigation apparatus to be affixed to the at least one other scour remediation and mitigation apparatus. Such ties are shown in FIGS. 6 and 7 in respect of securing weights to the scour remediation and mitigation apparatuses, but it will be readily understood that the tie could be used to connect scour remediation and mitigation apparatuses together in an installation.

Figure 6:
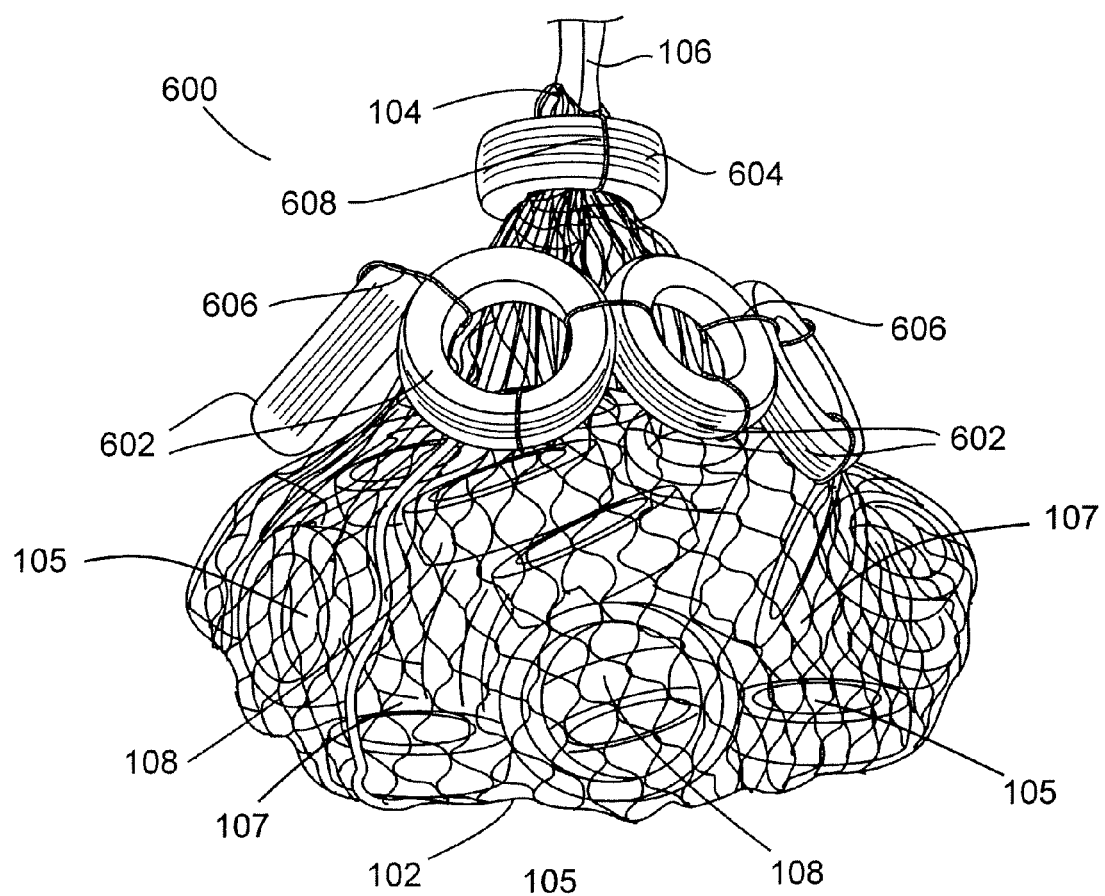
FIG. 6 is a diagrammatic view of a scour remediation and mitigation apparatus in accordance with a further embodiment of the present disclosure.
Figure 7:
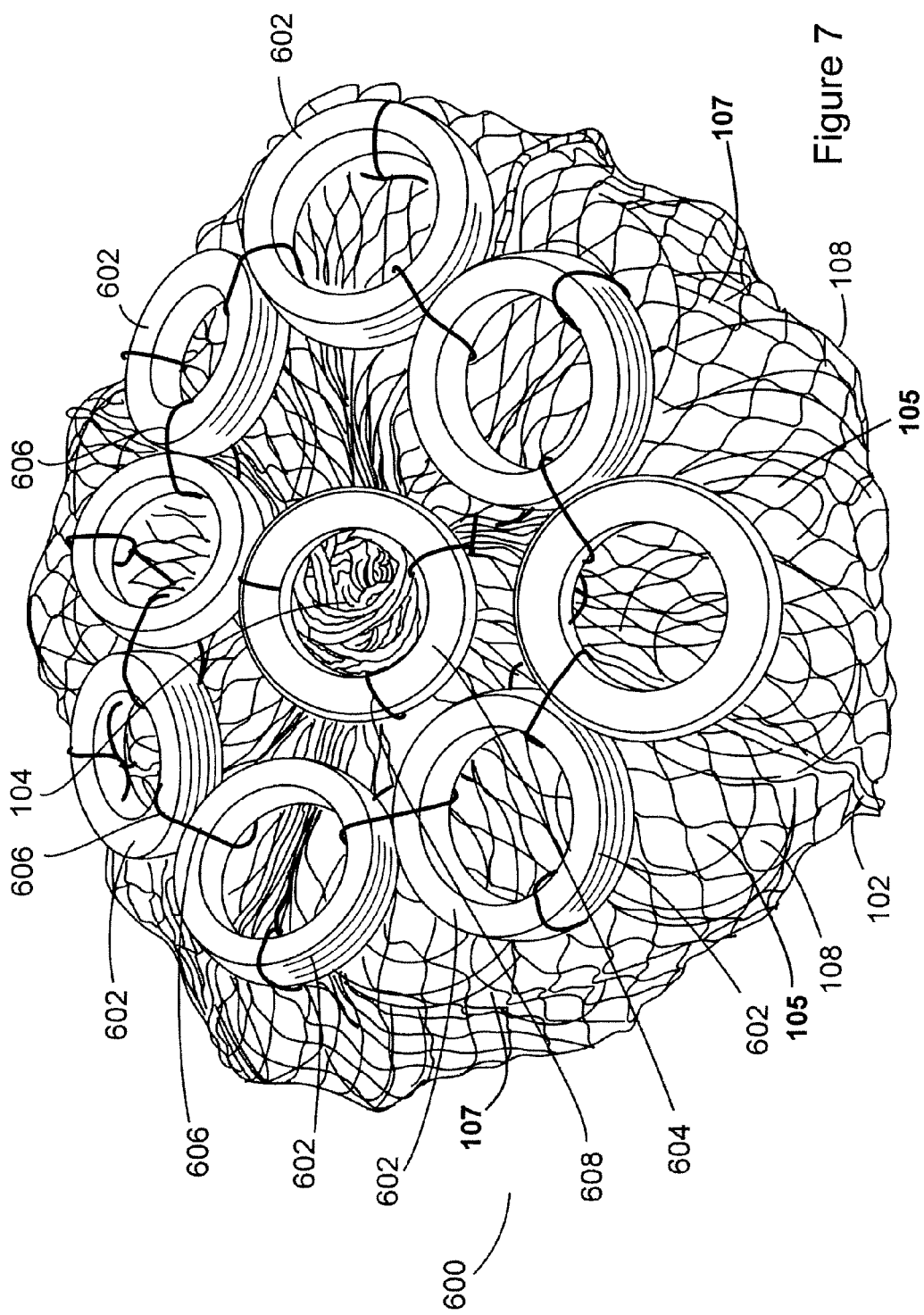
FIG. 7 is a further diagrammatic view of the scour remediation and mitigation apparatus of FIG. 6; and, FIG. 8 is a diagrammatic view showing the effects of scour damage around an underwater structure which is in abutment with a seabed.

Referring to FIGS. 6 and 7 together, yet a further embodiment of the scour remediation and mitigation apparatus is provided and is indicated generally by reference numeral 600. The scour remediation and mitigation apparatus 600 comprises means 606, 608 for connecting weights 602, 604 to the scour remediation and mitigation apparatus 600. These weights 602, 604 may be connected to the scour remediation and mitigation apparatus 600 to assist with lowering the scour remediation and mitigation apparatus 600 towards a bed of a body of water and/or maintaining the scour remediation and mitigation apparatus 600 in its installed location.

The weights 604, 606 may be therefore attached to the scour remediation and mitigation apparatus 600 on land prior to installing the scour remediation and mitigation apparatus 600, or, after the scour remediation and mitigation apparatus 600 has been moved into location on a seabed. The net bag 102 of the scour remediation and mitigation apparatus 600 comprises outwardly extending rope ends 606, 608 which act as ties to allow these weights 602, 604 to be connected to the scour remediation and mitigation apparatus 600. In the embodiment shown in FIGS. 6 and 7, additional tyres act as the weights 602, 604 and are attached to an exterior of the net bag 102 after they have been installed in position, or on land, prior to being installed. The additional tyres 602, 604 may preferably be filled with a weighted substance such as concrete although, this may not be necessary. These external tyres will assist with remediating the scour damage, will act as protection of the nets as they are transported on land, and will also act as the weights 602, 604 on the scour remediation and mitigation apparatus 600.

In further embodiments not shown it will be readily appreciated that the weights 602, 604 could alternatively be one or a combination of metals, stones and/or concrete objects.

Examples Of Presently Preferred Embodiments Of The Present Disclosure

1. A scour remediation and mitigation apparatus (100) comprising a plurality of channelled members (108) whereby the channelled members (108) are bound together to form the scour remediation and mitigation apparatus (100);
    the plurality of channelled members (108) each comprising at least one through hole (105) which forms a channel (105) through the channelled member (108);
    the plurality of channelled members (108) being bound together such that a plurality of conduits are formed by the channels (105) of the channelled members (108) and by voids (107) intermediate adjacent channelled members (108) within the scour remediation and mitigation apparatus (100);
    the plurality of conduits allowing passage of a moving fluid through the scour remediation and mitigation apparatus (100) whilst simultaneously causing dispersion of kinetic energy of the moving fluid as it passes through the scour remediation and mitigation apparatus (100).

2. A scour remediation and mitigation apparatus (100) as described in example 1, wherein, the channelled members (108) are bound together within a flexible porous housing (102).

3. A scour remediation and mitigation apparatus (100) as described in example 2, wherein, the flexible porous housing (102) is a net.

4. A scour remediation and mitigation apparatus (100) as described in examples 2 or 3, wherein, the flexible porous housing (102) is a net bag.

5. A scour remediation and mitigation apparatus (100) as described in any preceding examples, wherein, the plurality of channelled members (108) are connected in series together.

6. A scour remediation and mitigation apparatus (100) as described in any preceding examples, wherein, the plurality of channelled members (108) are each connected to at least one other channelled member (108).

7. A scour remediation and mitigation apparatus (100) as described in any preceding examples, wherein, the plurality of channelled members (108) are connected together by a length of rope (202).

8. A scour remediation and mitigation apparatus (100) as described in example 7, wherein, the length of rope (202) is preferably a length of laid rope.

9. A scour remediation and mitigation apparatus (100) as described in any preceding examples, wherein, a portion of the plurality of channelled members (108) are connected together into a string (200) of channelled members (108), and each of the channelled members (108) in the string (200) of channelled members (108) are only connected to other channelled members (108) in said string (200) of channelled members (108).

10. A scour remediation and mitigation apparatus (100) as described in example 9, wherein, the plurality of channelled members (108) are arranged into a set of distinct strings (200) of channelled members (108).

11. A scour remediation and mitigation apparatus (100) as described in example 10, wherein, each distinct string (200) of channelled members (108) comprises a substantially equal number of channelled members (108).

12. A scour remediation and mitigation apparatus (100) as described in any preceding examples, wherein, the scour remediation and mitigation apparatus (100) comprises affixing means (606) to allow each scour remediation and mitigation apparatus (100) to be affixed to at least one other scour remediation and mitigation apparatus (100).

13. A scour remediation and mitigation apparatus (100) as described in any preceding examples, wherein, the remediation and mitigation apparatus (100) comprises means (606, 608) for connecting weights to the scour remediation and mitigation apparatus (100).

14. A scour remediation and mitigation apparatus (100) as described in example 4, wherein, the net (102) of the scour remediation and mitigation apparatus (100) comprises ties (606) which extend outwardly from the net bag to act as affixing means to allow the scour remediation and mitigation apparatus (100) to be affixed to at least one other scour remediation and mitigation apparatus (100).

15. A scour remediation and mitigation apparatus (100) as described in example 4, wherein, the net (102) of the scour remediation and mitigation apparatus (100) comprises ties (606, 608) which extend outwardly from the net bag to allow weights (602, 604) to be connected to the scour remediation and mitigation apparatus (100).

16. A scour remediation and mitigation apparatus (100) as described in any preceding examples, wherein, the scour remediation and mitigation apparatus (100) comprises a location transmitting beacon.

17. A scour remediation and mitigation apparatus (100) as described in any preceding examples, wherein, the channelled members (108) have a specific weight in the range of 1.05 to 2.

18. A scour remediation and mitigation apparatus (100) as described in any of the preceding examples, wherein, the channelled members (108) are torus in shape.

19. A scour remediation and mitigation apparatus (100) as described in any of the preceding examples, wherein, the channelled members (108) are annular in shape.

20. A scour remediation and mitigation apparatus (100) as described in any of the preceding examples, wherein, the channelled members (108) are made of a rubber.

21. A scour remediation and mitigation apparatus (100) as described in any of the preceding examples, wherein, the channelled members (108) are rings having a C-shaped cross-section.

22. A scour remediation and mitigation apparatus (100) as described in any of the preceding examples, wherein, the channelled members (108) are tyres.

23. A scour remediation and mitigation apparatus (100) suitable for deployment adjacent an underwater structure (502), the scour remediation and mitigation apparatus (100) comprising a substantially monobloc body having a plurality of through conduits arranged therein, each conduit branching off at least one other conduit in the monobloc body so as to allow passage of a moving fluid through the scour remediation and mitigation apparatus (100) whilst simultaneously causing dispersion of kinetic energy of the moving fluid as it passes through the conduits of the scour remediation and mitigation apparatus (100).

24. A scour remediation and mitigation apparatus (100) as described in example 23, wherein, the scour remediation and mitigation apparatus (100) comprises affixing means to allow each scour remediation and mitigation apparatus (100) to be affixed to at least one other scour remediation and mitigation apparatus (100).

25. A scour remediation and mitigation apparatus (100) as described in example 23, wherein, the remediation and mitigation apparatus (100) comprises means for connecting weights to the scour remediation and mitigation apparatus (100).

26. A scour remediation and mitigation apparatus (100) as described in example 23, wherein, the scour remediation and mitigation apparatus (100) comprises ties which extend outwardly from the scour remediation and mitigation apparatus (100) to act as affixing means to allow the scour remediation and mitigation apparatus (100) to be affixed to at least one other scour remediation and mitigation apparatus (100).

27. A scour remediation and mitigation apparatus (100) as described in example 23, wherein, the scour remediation and mitigation apparatus (100) comprises ties which extend outwardly from the scour remediation and mitigation apparatus (100) to allow weights to be connected to the scour remediation and mitigation apparatus (100).

28. A scour remediation and mitigation apparatus (100) as described in any of examples 23 to 27, wherein, the scour remediation and mitigation apparatus (100) comprises a location transmitting beacon.

29. A scour remediation and mitigation apparatus (100) as described in any of examples 23 to 28, wherein, the scour remediation and mitigation apparatus (100) has a specific weight in the range of 1.05 to 2.

30. A scour remediation and mitigation apparatus (100) as described in any of the examples 23 to 29, wherein, the scour remediation and mitigation apparatus (100) is made of a rubber.

31. A method of protecting an underwater structure (502) against scour, by installing a plurality of scour remediation and mitigation apparatuses (100), as described in any preceding examples, adjacent the underwater structure (502), the method comprising the steps of:
lowering a first scour remediation and mitigation apparatus (100) into position adjacent the underwater structure (502);
lowering a second scour remediation and mitigation apparatus (100) into position adjacent the underwater structure (502) and affixing it to the first scour remediation and mitigation apparatus (100);
lowering further scour remediation and mitigation apparatuses (100) into positions adjacent the underwater structure (502) and affixing them to at least one of the already lowered scour remediation and mitigation apparatuses (100), until the underwater structure (502) is protected against scour by the plurality of scour remediation and mitigation apparatuses (100).

32. A method of protecting an underwater structure (502) against scour as described in example 31, wherein, the scour remediation and mitigation apparatuses (100) are lowered using weights (606, 608).

33. A method of protecting an underwater structure (502) against scour as described in examples 31 or 32, wherein, the scour remediation and mitigation apparatuses (100) are positioned during installation using location transmitting beacons.

34. A method of protecting an underwater structure (502) against scour as described in examples 31 or 33, wherein, weights (606, 608) are attached to the scour remediation and mitigation apparatuses (100) after they have been lowered into position.

35. A method of protecting an underwater structure (502) against scour as described in any of the examples 31 to 33, wherein, the scour remediation and mitigation apparatuses (100) each comprise a plurality of tyres (108) bound together in a net bag (102), with further tyres (602, 604) being affixed to an exterior of the net bags (102) of at least a portion of the scour remediation and mitigation apparatuses (100) after, or as, the portion of the scour remediation and mitigation apparatuses (100) have been lowered into position.

36. An anti-scour apparatus (100) for deployment in the vicinity of an object disposed in a body of water and in contact with a bed at the bottom of the body of water, the anti-scour apparatus (100) comprising: a porous structure having at least a plurality of cavities, at least some of the cavities having at least a wall and at least an open internal space, at least some of the cavities forming at least a portion of at least a through hole (105) that forms a channel (105), so that the anti-scour apparatus (100) includes a plurality of through holes (105) forming a plurality of channels (105).

37. The anti-scour apparatus (100) of example 36 wherein at least some of the through holes (105) forming the plurality of channels (105) are able to have positioned into at least a portion of at least some of the channels (105) an entire sphere having a diameter of at least two centimetres.

38. The anti-scour apparatus (100) of example 36 wherein at least some of the through holes (105) forming the plurality of channels (105) are able to have positioned into at least a portion of at least some of the channels (105) an entire sphere having a diameter of at least four centimetres.
39. The anti-scour apparatus (100) of example 36 wherein at least some of the through holes (105) forming the plurality of channels (105) are able to have positioned into at least a portion of at least some of the channels (105) an entire sphere having a diameter of at least two centimetres.
40. The anti-scour apparatus (100) of example 36 wherein at least some of the through holes (105) forming the plurality of channels (105) are able to have positioned into at least a portion of at least some of the channels (105) an entire sphere having a diameter of at least five centimetres.
41. The anti-scour apparatus (100) of example 36 wherein at least some of the through holes (105) forming the plurality of channels (105) exhibit a width of at least five centimetres measured across at least a portion of at least some of the channels (105).
42. The anti-scour apparatus (100) of example 36 wherein at least some of the through holes (105) forming the plurality of channels (105) exhibit a width of at least seven centimetres measured across at least a portion of at least some of the channels (105).
43. The anti-scour apparatus (100) of example 36 wherein at least some of the through holes (105) forming the plurality of channels (105) exhibit a width of at least eleven centimetres measured across at least a portion of at least some of the channels (105).
44. The anti-scour apparatus (100) of example 36 wherein at least some of the through holes (105) forming the plurality of channels (105) exhibit a width of at least fifteen centimetres measured across at least a portion of the at least some of the channels (105).
45. The anti-scour apparatus (100) of example 36 wherein at least some of the through holes (105) forming the plurality of channels (105) exhibit a width of at least seventeen centimetres measured across at least a portion of at least some of the channels (105).
46. The anti-scour apparatus (100) of example 36 wherein at least some of the through holes (105) forming the plurality of channels (105) exhibit a width of at least twenty-one centimetres measured across at least a portion of at least several of the channels (105).
47. The anti-scour apparatus (100) of example 36 wherein at least some of the through holes (105) forming the plurality of channels (105) exhibit a width of at least twenty-six centimetres measured across at least a portion of at least several of the channels (105).
48. The anti-scour apparatus (100) of any of the above examples where the anti-scour apparatus (100) exhibits a weight in air that is less than seventy percent of a weight in air of a conventional and previously known scour remediation and mitigation structure formed of cement blocks.
49. The anti-scour apparatus (100) of any of the above examples where the anti-scour apparatus (100) exhibits a weight in air that is less than sixty percent of a weight in air of a conventional and previously known scour remediation and mitigation structure formed of cement blocks.
50. The anti-scour apparatus (100) of any of the above examples where the anti-scour apparatus (100) exhibits a weight in air that is less than sixty percent of a weight in air of a conventional and previously known scour remediation and mitigation structure formed of a stone bag, where the anti-scour apparatus (100) and the stone bag are of similar size.
51. The anti-scour apparatus (100) of any of the above examples where the anti-scour apparatus (100) exhibits a weight in air that is less than fifty percent of a weight in air of a conventional and previously known scour remediation and mitigation structure formed of a stone bag, where the anti-scour apparatus (100) and the stone bag are of similar size.

It is further envisaged that a location transmitting beacon, for example which could use the Global Positioning System (GPS), is connected to each of the scour remediation and mitigation apparatuses and is used to detect the co-ordinates of the scour remediation and mitigation apparatus. These co-ordinates are then relayed to a remote monitoring station where the precise location of each scour remediation and mitigation apparatus can be assessed and monitored to ensure that the scour remediation and mitigation apparatus is in the correctly installed location and has not moved over time due to tidal and current effects.

For commercial reasons, the use of tyres as the channelled members within the net bag is very advantageous. It is intended that any size of tyre may be used, although the tyres will advantageously be used car tyres. Tyre-like objects may also be specifically manufactured and used for this particular purpose. By using any type of tyre, there is no need to sort and select any tyres which simplifies the scour remediation and mitigation apparatus assembly procedure. Tyres are also advantageously used as the weights although it will be appreciated that they perform a different function to the tyre acting as channelled members within the net bag.

The flexible porous housing, i.e. the net, net bag, or netting 102 may preferably be meshed twin stretched knot net bag, with a volume of 5 m³. Of course, any suitably sized net bag may be used.

It will also be understood that at the crux of the present disclosure is the remediation of scour damage and dissipation of the energy of the currents through a plurality of conduits. Therefore, it will be readily understood that a monobloc body having a number of energy dissipating conduits running through it would provide the same technical advantage as the preferred embodiment of a scour remediation and mitigation apparatus which comprises a plurality of tyres within a net bag. However, it will be understood that such a monobloc scour remediation and mitigation apparatus would not be capable of deforming into a trench, or hole, in the same manner as a plurality of tyres within a net bag. However, these types of monobloc scour remediation and mitigation apparatus could be useful for protection of harbour walls, shorelines and the like by installing a row of such monobloc scour remediation and mitigation apparatuses in front of the shoreline.

Throughout this specification, the present disclosure has been directed towards the remediation of scour damage and the prevention or minimisation of further scouring from occurring on the seabed. However, it will be readily understood that the method and apparatus are equally applicable to the remediation and prevention/minimisation of scouring on riverbeds and other bodies of water where currents, which lead to scouring, are to be found.

The present disclosure will thusly be also understood to be directed towards a simple and effective method for remediating and preventing, or at least minimising, scour from occurring on river banks, inland waterways, canal banks and revetments on such banks. The scour remediation and mitigation apparatus of the present disclosure can be used as in-fill to repair such damaged banks and revetments and further minimise the chance of future scouring damage. The scour remediation and mitigation apparatus can be used as a core with local sand, shingle or other such in-fill material.

It will be readily appreciated that the sizes, weights and volumes of the scour remediation and mitigation apparatus described hereinbefore may be changed without departing from the inventive concept of the present disclosure The sizes, weights and volumes hereinbefore mentioned should therefore not be taken as limiting the present disclosure in any manner.

It will be understood that in some scenarios the remediation and mitigation apparatus of the present disclosure will mitigate scour so effectively as to completely prevent scour from occurring.

It will be understood that any reference to an "underwater structure" or "seabed structure" shall refer to a structure which comprises a portion of the structure beneath the surface of a body of water, and adjacent to or in contact with and or in abutment with a bed of a body of water. The body of water could be an ocean, a sea, a lake, a river or any types of body of water whose bed is susceptible to scouring. The structure may not be entirely submerged and indeed in many cases the underwater structures referred to in the preceding specification shall comprise a portion of the structure beneath a water level and a portion of the structure above the water level.

The terms "comprise" and "include", and any variations thereof required for grammatical reasons, are to be considered as interchangeable and accorded the widest possible interpretation.

It will be understood that the components shown in any of the drawings are not necessarily drawn to scale, and, like parts shown in several drawings are designated the same reference numerals.

The present disclosure is not limited to the embodiments hereinbefore described which may be varied in both construction and detail.

The invention claimed is:

1. A scour remediation and mitigation apparatus comprising:
    a plurality of channelled members bound together to form the scour remediation and mitigation apparatus;
    the plurality of channelled members each comprising at least one through hole which forms a channel through the channelled member;
    the plurality of channelled members being bound together within a flexible porous housing comprising a net bag such that a plurality of conduits are formed by the channels of the channelled members and by voids intermediate adjacent channelled members within the scour remediation and mitigation apparatus, said plurality of channelled members being arranged irregularly when bound together so as to cause a pseudo-random arrangement of the plurality of conduits within the scour remediation and mitigation apparatus;
    the plurality of conduits allowing passage of a moving fluid through the scour remediation and mitigation apparatus whilst simultaneously causing dispersion of kinetic energy of the moving fluid as it passes through the scour remediation and mitigation apparatus.

2. The scour remediation and mitigation apparatus as claimed in claim 1, wherein, the plurality of channelled members are connected in series together.

3. The scour remediation and mitigation apparatus as claimed in claim 1, wherein, the plurality of channelled members are each connected to at least one other channelled member.

4. The scour remediation and mitigation apparatus as claimed in claim 1, wherein, the plurality of channelled members are connected together by a length of rope.

5. The scour remediation and mitigation apparatus as claimed in claim 1, wherein, a portion of the plurality of channelled members are connected together into a string of channelled members, and each of the channelled members in the string of channelled members are only connected to other channelled members in said string of channelled members.

6. The scour remediation and mitigation apparatus as claimed in claim 1, wherein, the net bag of the scour remediation and mitigation apparatus comprises ties which extend outwardly from the net bag to act as affixing means to allow the scour remediation and mitigation apparatus to be affixed to at least one other scour remediation and mitigation apparatus.

7. The scour remediation and mitigation apparatus as claimed in claim 1, wherein, the net bag of the scour remediation and mitigation apparatus comprises ties which extend outwardly from the net bag to allow weights to be connected to the scour remediation and mitigation apparatus.

8. The scour remediation and mitigation apparatus as claimed in claim 1, wherein, the scour remediation and mitigation apparatus comprises a location transmitting beacon.

9. The scour remediation and mitigation apparatus as claimed in claim 1, wherein, the channelled members have a specific weight in the range of 1.05 to 2.

10. The scour remediation and mitigation apparatus as claimed in claim 1, wherein, the channelled members are torus in shape.

11. The scour remediation and mitigation apparatus as claimed in claim 1, wherein, the channelled members are annular in shape.

12. The scour remediation and mitigation apparatus as claimed in claim 1, wherein, the channelled members are made of a rubber.

13. The scour remediation and mitigation apparatus as claimed in claim 1, wherein, the channelled members are rings having a C-shaped cross-section.

14. The scour remediation and mitigation apparatus as claimed in claim 1, wherein, the channelled members are tyres.

15. A method of protecting an underwater structure against scour, by installing a plurality of scour remediation and mitigation apparatuses, as claimed in claim 1, adjacent the underwater structure, the method comprising:
    lowering a first scour remediation and mitigation apparatus into position adjacent the underwater structure;
    lowering a second scour remediation and mitigation apparatus into position adjacent the underwater structure and affixing it to the first scour remediation and mitigation apparatus; and
    lowering further scour remediation and mitigation apparatuses into positions adjacent the underwater structure and affixing them to at least one of the already lowered scour remediation and mitigation apparatuses, until the underwater structure is protected against scour by the plurality of scour remediation and mitigation apparatuses.

16. The method of protecting an underwater structure against scour as claimed in claim 15, wherein, the scour remediation and mitigation apparatuses are lowered using weights.

17. The method of protecting an underwater structure against scour as claimed in claim 15, wherein, the scour remediation and mitigation apparatuses are positioned during installation using location transmitting beacons.

18. The method of protecting an underwater structure against scour as claimed in claim 15, wherein, the scour remediation and mitigation apparatuses each comprise a plurality of tyres bound together in the net bag, with further tyres being affixed to an exterior of the net bags of at least a portion of the scour remediation and mitigation apparatuses after, or as, the scour remediation and mitigation apparatuses have been lowered into position.

\* \* \* \* \*

UNITED STATES PATENT AND TRADEMARK OFFICE
CERTIFICATE OF CORRECTION

PATENT NO. : 9,458,589 B2  
APPLICATION NO. : 14/766916  
DATED : October 4, 2016  
INVENTOR(S) : Jonathan Francis Gallagher and William Austin Wilcox Page 1 of 1

It is certified that error appears in the above-identified patent and that said Letters Patent is hereby corrected as shown below:

On the Title Page

Item (71) Applicant: should read 'NORFOLK MARINE LIMITED'

In the Specification

Column 2, Line 33: should read 'pressing need exists', not 'pressing need to exists'
Column 3, Line 5: should read 'readily be appreciated', not 'readily be appreciate'
Column 4, Line 50: should read 'channelled members together.', not 'channelled members together'
Column 6, Line 4: should read 'a typical construction', not 'an typical construction'
Column 10, Line 3: should read 'to act as', not 'to acts as'
Column 12, Line 31: should read 'trenches and holes are in-filled', not 'trenches and holes and in-filled'
Column 19, Line 9: should read 'of the present disclosure.', not 'of the present disclosure'

Signed and Sealed this
Twenty-first Day of March, 2017

Michelle K. Lee
*Director of the United States Patent and Trademark Office*